US010275449B1

(12) United States Patent
Hayes et al.

(10) Patent No.: US 10,275,449 B1
(45) Date of Patent: Apr. 30, 2019

(54) IDENTIFICATION AND PARSING OF A LOG RECORD IN A MERGED LOG RECORD STREAM

(71) Applicant: SAS Institute Inc., Cary, NC (US)

(72) Inventors: Keefe Hayes, Cary, NC (US); Robert N. Bonham, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/150,382

(22) Filed: Oct. 3, 2018

Related U.S. Application Data

(60) Provisional application No. 62/632,271, filed on Feb. 19, 2018, provisional application No. 62/652,289, filed on Apr. 3, 2018, provisional application No. 62/690,120, filed on Jun. 26, 2018.

(51) Int. Cl.
*G06F 17/27* (2006.01)
*G06F 17/30* (2006.01)
*G06F 16/2455* (2019.01)

(52) U.S. Cl.
CPC .... *G06F 17/2765* (2013.01); *G06F 16/24568* (2019.01); *G06F 17/2705* (2013.01); *G06F 17/30516* (2013.01)

(58) Field of Classification Search
CPC combination set(s) only.
See application file for complete search history.

(56) References Cited

U.S. PATENT DOCUMENTS

| 6,393,389 B1* | 5/2002 | Chanod ................. G06F 17/271 704/4 |
| 9,218,427 B1* | 12/2015 | Thompson .......... G06F 17/3087 |
| 2004/0122654 A1* | 6/2004 | Moore .................. G06F 17/271 704/4 |
| 2009/0164437 A1* | 6/2009 | Torbjornsen ...... G06F 17/30622 |

OTHER PUBLICATIONS

Wikipedia, Regular Expression, https://en.wikipedia.org/wiki/Regular_expression, printed Oct. 10, 2018, pp. 1-23.
(Continued)

*Primary Examiner* — Abul K Azad
(74) *Attorney, Agent, or Firm* — Bell & Manning, LLC

(57) ABSTRACT

A computing device automatically creates a log record recognizer expression and uses the log record recognizer expression to identify a log record type for a log record to parse the log record. A log record type regular expression is selected from log record type regular expressions and is separated into subexpressions that are normalized and are reassembled into an expression recognizer for each log record type regular expression. The expression recognizer for each is read into a data structure. The recognizer expressions are sorted based on an order associated with an expression operator of each subexpression. A log recognizer expression is created from each read expression recognizer included in the sorted recognizer expressions. A log record type of a log record is identified using the created log recognizer expression. A log record type regular expression is selected. The log record is parsed using the selected log record type regular expression.

30 Claims, 11 Drawing Sheets

(56) References Cited

OTHER PUBLICATIONS

Regular-Expressions.info, Regex Tutorial, Examples and Reference, https://www.regular-expressions.info/index.html, printed from the internet Oct. 10, 2018, pp. 1-2.
SAS Event Stream Processing Engine 2.3 User's Guide, 2014, pp. 1-314.
Windham, K. Matthew, Introduction to Regular Expressions in SAS, CAP SAS Institute, Dec. 2014, pp. 1-18.

* cited by examiner

IDENTIFICATION AND PARSING OF A LOG RECORD IN A MERGED LOG RECORD STREAM

CROSS-REFERENCE TO RELATED APPLICATIONS

The present application claims the benefit of 35 U.S.C. § 119(e) to U.S. Provisional Patent Application No. 62/632,271 filed Feb. 19, 2018, to U.S. Provisional Patent Application No. 62/652,289 filed Apr. 3, 2018, and to U.S. Provisional Patent Application No. 62/690,120 filed Jun. 26, 2018, the entire contents of which are all hereby incorporated by reference.

BACKGROUND

Computer systems, and the devices and applications that define them, commonly report events as semi-structured records written to log files. These records conform to patterns of text fields. The lack of common standards, the introduction of localizations, and the desire to describe many types of events (e.g., log, audit, and trace-back) makes parsing of the records complex. To extract meaning from this information, regular expressions have been used to parse the log records into fields to produce consistently formatted and meaningful log events. However, parsing a given log record first requires identifying the log record's type, for example, based on its source. A log file with multiple record types or a merged log stream from multiple sources, challenges identification as the number of log record regular expressions increases resulting in central processing unit (CPU) intensive detection processing with significant scalability limitations. Nevertheless, processing a large system's log events as a single stream facilitates discovery of correlations that enables faster recognition of issues and improves the reliability of a system. As a result, log record parsing into uniform events can benefit substantially from efficient log record identification.

SUMMARY

In an example embodiment, a non-transitory computer-readable medium is provided having stored thereon computer-readable instructions that, when executed by a computing device, cause the computing device to automatically create a log record recognizer expression and use the created log record recognizer expression to identify a log record type for a log record to parse the log record. A plurality of log record type regular expressions is received. Each log record type regular expression of the plurality of log record type regular expressions describes a pattern of text included for a log record type associated with each log record type regular expression. A log record type regular expression is selected from the plurality of log record type regular expressions. (a) The selected log record type regular expression is separated into subexpressions. (b) Each subexpression of the subexpressions is normalized. (c) Each normalized subexpression is reassembled into an expression recognizer for the log record type associated with the selected log record type regular expression. (d) (a) to (c) are repeated with each remaining log record type regular expression of the plurality of log record type regular expressions selected as the log record type regular expression. (e) The expression recognizer for each of the plurality of log record type regular expressions is read into a data structure. (f) An expression operator for each subexpression of each read expression recognizer is determined. (g) The read recognizer expressions are sorted based on an order associated with the determined expression operator for each subexpression of each read expression recognizer. (h) A log recognizer expression is created from each read expression recognizer included in the sorted read recognizer expressions. (i) A log record is received. (j) The log record type of the received log record is identified using the created log recognizer expression. (k) A log record type regular expression associated with the identified log record type is selected. (l) The received log record is parsed using the selected log record type regular expression. (m) The parsed, received log record is output.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to automatically create a log record recognizer expression and use the created log record recognizer expression to identify a log record type for a log record to parse the log record.

In an example embodiment, a method of automatically creating a log record recognizer expression and using the created log record recognizer expression to identify a log record type for a log record to parse the log record is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

The format of text fields in a log record can be described concisely with a regular expression that may be elaborate and sophisticated. Therefore, applying a regular expression to extract the fields of a log record can be computationally intensive. If there are many record formats to evaluate to discover the correct regular expression to parse the log record, using the regular expressions themselves for identification can incur a significant performance impact. Developing a mechanism to recognize each record's type prior to applying the appropriate regular expression can yield substantial performance benefits. This recognition process must be efficient while limiting false positives that result in applying the wrong regular expression to a record and consequently in interpretation errors when parsing the log record.

Aggregation of logs into a single stream of log events enhances the ability to monitor these events in real time for timely recognition of events and discovery of time-based correlations among events across a large system. The volume and variety of log records means that a process for interpreting and streaming these into log events must perform well. The focus on prompt aggregation of records, prior to their parsing and interpretation, enables narrowing the time window for analysis of correlations as log volumes grow with the increasing number of services and devices reporting.

Common fields of a log record include: a timestamp field, a message field, a level (e.g. INFO or ERROR) field, a local field, a user field, a remote field, a request field, a result field, etc. Additional fields specific to a log record type may also be extracted and added to a list of miscellaneous properties.

Figure 1:
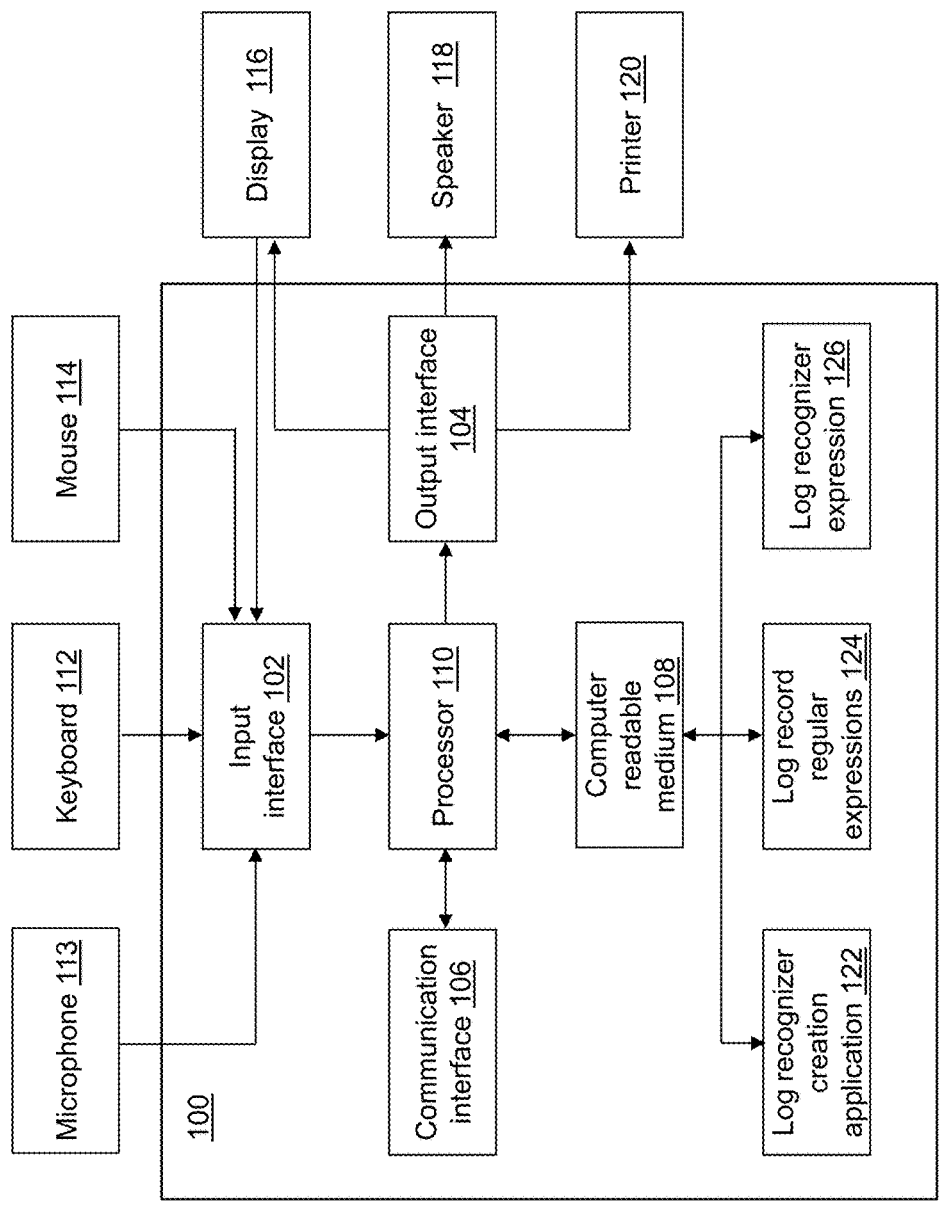
FIG. 1 depicts a block diagram of a log recognizer creation device in accordance with an illustrative embodiment.

Referring to FIG. 1, a block diagram of a log recognizer creation device 100 is shown in accordance with an illustrative embodiment. Log recognizer creation device 100 may include an input interface 102, an output interface 104, a communication interface 106, a non-transitory computer-readable medium 108, a processor 110, a log recognizer creation application 122, log record regular expressions 124, and a log recognizer expression 126. Fewer, different, and/or additional components may be incorporated into log recognizer creation device 100.

Input interface 102 provides an interface for receiving information from the user or another device for entry into log recognizer creation device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into log recognizer creation device 100 or to make selections presented in a user interface displayed on display 116. The same interface may support both input interface 102 and output interface 104. For example, display 116 comprising a touch screen provides a mechanism for user input and for presentation of output to the user. Log recognizer creation device 100 may have one or more input interfaces that use the same or a different input interface technology. The input interface technology further may be accessible by log recognizer creation device 100 through communication interface 106.

Output interface 104 provides an interface for outputting information for review by a user of log recognizer creation device 100 and/or for use by another application or device. For example, output interface 104 may interface with various output technologies including, but not limited to, display 116, a speaker 118, a printer 120, etc. Log recognizer creation device 100 may have one or more output interfaces that use the same or a different output interface technology. The output interface technology further may be accessible by log recognizer creation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Log recognizer creation device 100 may have one or more communication interfaces that use the same or a different communication interface technology. For example, log recognizer creation device 100 may support communication using an Ethernet port, a Bluetooth antenna, a telephone jack, a USB port, etc. Data and messages may be transferred between log recognizer creation device 100 and another computing device using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Log recognizer creation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Log recognizer creation device 100 also may have one or more drives that support the loading of a memory media such as a CD, DVD, an external hard drive, etc. One or more external hard drives further may be connected to log recognizer creation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Log recognizer creation device 100 may include a plurality of processors that use the same or a different processing technology.

Log recognizer creation application 122 performs operations associated with defining log recognizer expression 126 from log record regular expressions 124 that may be stored locally and/or on a distributed computing system, may be streamed to log recognizer creation device 100, or may be received through input interface 102 from a user of log recognizer device 100. Log recognizer expression 126 is used to identify a log record type for a log record as log records are received and processed. Some or all of the operations described herein may be embodied in log recognizer creation application 122. The operations may be implemented using hardware, firmware, software, or any combination of these methods.

Referring to the example embodiment of FIG. 1, log recognizer creation application 122 is implemented in software (comprised of computer-readable and/or computer-executable instructions) stored in computer-readable medium 108 and accessible by processor 110 for execution of the instructions that embody the operations of log recognizer creation application 122. Log recognizer creation application 122 may be written using one or more programming languages, assembly languages, scripting languages, etc. Log recognizer creation application 122 may be integrated with other analytic tools. As an example, log recognizer creation application 122 may be part of an integrated data analytics software application and/or software architecture such as that offered by SAS Institute Inc. of Cary, N.C., USA. For example, log recognizer creation application 122 may be integrated with one or more SAS software tools such as SAS® Enterprise Miner™ SAS® Factory Miner, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream Processing (ESP) all of which are developed and provided by SAS Institute Inc. of Cary, N.C., USA. Data mining and data analytics is applicable in a wide variety of industries.

Log recognizer creation application 122 may be integrated with other system processing tools to automatically process log records generated as part of operation of an enterprise, device, system, facility, etc., to monitor changes in log record regular expressions 124 and to provide a warning or alert associated with the log record processing using input interface 102, output interface 104, and/or communication interface 106 so that appropriate action can be initiated in response to information parsed from the log records.

Log recognizer creation application 122 may be implemented as a Web application. For example, log recognizer creation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Log record regular expressions 124 may include a plurality of regular expressions. A regular expression is a way for a computer user or programmer to express how a computer program should look for a specified pattern in text and what the program is to do when each pattern match is found to extract information from a record. Each regular expression is associated with a unique log record type. Each regular expression describes a pattern of text included for the unique log record type. For example, Table I below associates a unique log record type identifier with a regular expression. The unique log record type identifier may also be a unique numeric value that may or may not also be associated with the unique log record type identifier.

TABLE I

| Log record type | Regular expression |
|---|---|
| Consul | tttt(?P<timestamp>\d{4}\/\d\d\/\d\d \d\d:\d\d:\d\d) (?:\[(?P<level>[A-Z]*)\] \|)(?:(?P<command>[^:]+): \|)(?P<message>.*) |
| Postgres | (?P<timestamp>\d{4}-\d\d-\d\d \d\d:\d\d:\d\d\.\d{3} [A-Z]{3}) ?(?P<level>[A-Z]+[1-5]?): (?P<message>.*) |
| RabbitMQ | (?P<timestamp>\d{4}-\d\d-\d\d \d\d:\d\d:\d\d\.\d{3}) \[(?P<level>[a-z]+)\] (?P<pid><[^>]*>) (?P<message>.*) |
| Java Server | (?P<timestamp>\d{4}\/\d\d\/\d\d \d\d:\d\d:\d\d) (?:\[(?P<level>[A-Z]+)\] \|)(?:\((?P<command>[a-z]+)\) \|)(?P<message>.*) |
| SAS Server | (?P<timestamp>\d{4}-\d\d-\d\dT\d\d:\d\d:\d\d\d{3}) (?:(?P<level>[A-Z]+ +\[(?P<index>\d*)\] (?:(?:(?:(?P<session>\d*):\|)(?P<user>[^ ]*)\|(?:(?P<connection>[ ]*)\|(?P<message>.*?) |
| Microservice | (?P<timestamp>\d{4}-\d\d-\d\d \d\d:\d\d:\d\d\.\d{3}) (?:(?P<user>[^ ]*) \|) ?(?P<level>[A-Z]+) (?:(?P<pid>\d+) \|(?P<process>[^ ]+) \|)--- (?:\[ *(?P<threadname>[^\]]*)\] (?P<classname>[^ ]* +: +\|)(?P<message>.*) |
| Syslog | (?P<timestamp>(?:Jan\|Feb\|Mar\|Apr\|May\|Jun\|Jul\|Aug\|Sep\|Oct\|Nov\|Dec) [ \d]\d \d\d:\d\d:\d\d) (?P<hostname>[^ ]+) (?P<process>[^:]+): (?P<message>.*) |
| Syslog ISO8601 | (?P<timestamp>\d{4}-\d\d-\d\dT\d\d:\d\d:\d\d\.\d{6}[+-]\d\d:\d\d) (?P<hostname>[^ ]+) (?P<process>[^:]+): (?P<message>.*) |
| Web Server | (?P<remote>[^ ]*) [ ]* (?P<user>[^ ]*) \[(?P<timestamp>\d\d\/(?:Jan\|Feb\|Mar\|Apr\|May\|Jun\|Jul\|Aug\|Sep\|Oct\|Nov\|Dec)\/\d{4}:\d\d:\d\d:\d\d [+-]?\d{4})\] "(?P<message>(?P<method>[A-Z-]*) (?P<url>[^ ]*) (?P<protocol>[^ |

TABLE I-continued

| Log record type | Regular expression |
|---|---|
| | ]*)|.*)" (?P<status>\d{3}) (?P<size>\d+|-)(?: "(?P<referer>[^"]*)" "(?P<agent>[^"]*)"|) |

Log record regular expressions 124 may be stored on computer-readable medium 108 and/or on another non-transitory computer-readable media of a distributed computing system and accessed by or received by log recognizer creation device 100 using communication interface 106, input interface 102, and/or output interface 104.

Figure 2:
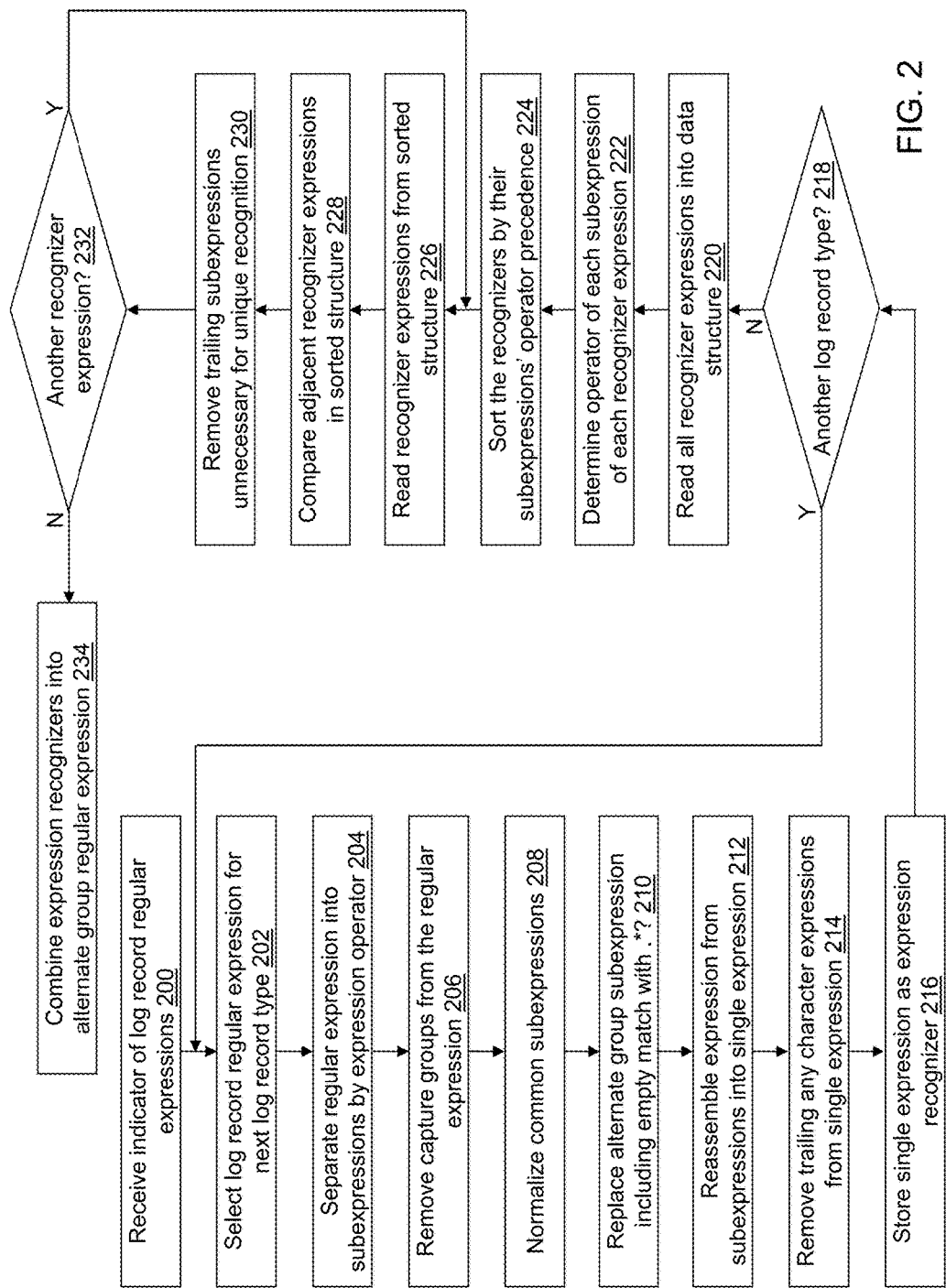
FIG. 2 depicts a flow diagram illustrating examples of operations performed by the log recognizer creation device of FIG. 1 in accordance with an illustrative embodiment.

Referring to FIG. 2, example operations associated with log recognizer creation application 122 are described. Additional, fewer, or different operations may be performed depending on the embodiment of log recognizer creation application 122. The order of presentation of the operations of FIG. 2 is not intended to be limiting. Although some of the operational flows are presented in sequence, the various operations may be performed in various repetitions, concurrently (in parallel, for example, using threads), and/or in other orders than those that are illustrated. For example, a user may execute log recognizer creation application 122, which causes presentation of a first user interface window, which may include a plurality of menus and selectors such as drop-down menus, buttons, text boxes, hyperlinks, etc. associated with log recognizer creation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by log recognizer creation application 122.

Referring to FIG. 2, in an operation 200, a first indicator may be received that indicates log record regular expressions 124. The first indicator may indicate a location and a name of log record regular expressions 124. As an example, the first indicator may be received by log recognizer creation application 122 after selection from a user interface window or after entry by a user into a user interface window. In an alternative embodiment, log record regular expressions 124 may not be selectable. For example, a most recently created dataset may be used automatically. As another example, log record regular expressions 124 may be streamed to log recognizer creation device 100.

In an operation 202, a log record regular expression is selected for a next log record type. For example, on a first iteration of operation 202, the next log record type is a first log record type; on a second iteration of operation 202, the next log record type is a second log record type; and so on until each log record regular expression of the log record regular expressions 124 is selected as the next log record type. For illustration, each of the nine regular expressions of Table I is selected for the next log record type in nine iterations of operation 202.

In an operation 204, the selected log record regular expression is separated into subexpressions by an expression operator. The primary expression operators are literal expression, alternate group expression, character class expression, and any character expression. For example, the regular expression (\d{4})␣(literal)␣(alt1|alt2|)␣([chars]+) ␣(.*) becomes a character class subexpression (\d{4}), a literal subexpression (literal), an alternate group subexpression (alt1|alt2|), a second character class subexpression ([chars]+), and an any character subexpression (.*). Note that "␣" represents a blank space character that may be significant in leading, trailing, or repeating space literals and/or to separate subexpressions.

In an operation 206, capture groups are removed from the regular expression. A capture group is a subexpression of the regular expression enclosed in parentheses. A group can be unnamed (e.g., subexp) or named (e.g., ?P:<name>subexp), and is replaced with subexp. Since an alternate group also uses parentheses: (alt1|alt2|alt3) to disable capture processing, "?:" is inserted: (?:alt1|alt2|alt3).

In an operation 208, any common subexpression is normalized from each subexpression. For example, \d{2} is replaced with [0-9][0-9], d{4} is replaced with [0-9][0-9] [$^{0-9}$][$^{0-9}$], [A-Z]{4,5} is replaced with [A-Z][A-Z][A-Z][A-Z][A-Z]?, and (\d|\d\d) is replaced with [0-9][0-9]?.

In an operation 210, any subexpression identified as being an alternate group expression and including an empty match is replaced with ".*?". For example, (?:alt1|alt2|) is replaced with .*?.

As a result, after application of operations 204 to 210, the first subexpression is replaced with [0-9][0-9][0-9][0-9], the second subexpression is replaced with literal, the third subexpression is replaced with .*?, the fourth subexpression is replaced with [chars][chars]*, and the fifth subexpression is replaced with .*.

In an operation 212, the subexpressions after application of operations 204 to 210 are reassembled into a single expression. For example, the first through fifth subexpressions are reassembled to define [0-9][0-9][0-9][0-9] literal .*?-[chars][chars]* .*? as the single expression for the next log record type. The subexpressions may be cached with the expression for use in subsequent comparison operations.

In an operation 214, any trailing subexpression(s) included at an end of the single expression and identified as being the any character class expression are removed from the single expression. For example, .*? is removed from the end of the single expression to define [0-9][0-9][0-9][0-9] literal .*? - [chars][chars]* as the single expression.

In an operation 216, an expression recognizer for the next log record type is created from the single expression and may be stored in association with the next log record type and/or the log record regular expression.

In an operation 218, a determination is made concerning whether or not there is another log record type to process. When there is another log record type to process, processing continues in operation 202 to select the next log record type. When there is not another log record type to process, processing continues in an operation 220.

In operation 220, the expression recognizers are prepared for sorting by reading them into separate items of an expression recognizer data structure such as a list, an array, etc.

In operation 222, the operator for each subexpression of each expression recognizer is determined. The selected expression recognizer's subexpressions are obtained either from that expression recognizer's cached subexpression list defined in operation 204 or by identifying it from the expression recognizer by expression operator as by repeating operation 204.

In operation 224, the expression recognizers included in the expression recognizer data structure are sorted by comparing the expression operator determined for each subexpression of each expression recognizer in order of most strict to least strict. Expression operator precedence is literal (most strict), alternate group, character class, and any character (least strict). For example: Jan is more strict than (?:Jan|Feb|Mar), which is more strict than [A-Z][a-z][a-z], which is more strict than .*.

In operation 226, an expression recognizer is read from the sorted expression recognizer data structure as a first expression recognizer. On a first iteration of operation 226, a second expression recognizer and a third expression recognizer are also read from the sorted expression recognizer data structure. On a second iteration of operation 226, the first expression recognizer is replaced with the second expression recognizer, the second expression recognizer is replaced with the third expression recognizer, and the third expression recognizer is replaced with a fourth expression recognizer; and so on until each expression recognizer included in the sorted expression recognizer data structure is read as the third expression recognizer.

In operation 228, the second expression recognizer is compared to the first expression recognizer (next higher order) and to the third expression recognizer (next lower order). The comparison compares the operator of each subexpression of the associated expression recognizer based on the subexpression operator precedence.

In operation 230, when an operator is distinct among the adjacent recognizers, subsequent trailing subexpressions are unnecessary for recognition and removed.

In an operation 232, a determination is made concerning whether or not there is another expression recognizer to process. When there is another expression recognizer to process, processing continues in operation 226 to select the next expression recognizer. When there is not another expression recognizer to process, processing continues in an operation 234 to define log recognizer expression 126.

For illustration, each of the nine expression recognizers created from the nine regular expressions included in Table I and produced in operation 230 is shown in Table II below. The recognizers in the table are ordered corresponding to the regular expressions in Table I stored in operation 216, not in the operator precedence ordered expression recognizers defined in operation 224 to aid with visual inspection and comparison.

TABLE II

| Log record type | Expression recognizer |
| --- | --- |
| Consul | tttt[0-9] |
| Postgres | [0-9][0-9][0-9][0-9]-[0-9][0-9]-[0-9][0-9][0-9][0-9]:[0-9][0-9]:[0-9][0-9]\.[0-9][0-9][0-9][A-Z][A-Z][A-Z] ?[A-Z] |
| RabbitMQ | [0-9][0-9][0-9][0-9]-[0-9][0-9]-[0-9][0-9] [0-9][0-9]:[0-9][0-9]:[0-9][0-9]\.[0-9][0-9][0-9]\[[a-z]+\]< |
| Java Server | [0-9][0-9][0-9][0-9]/[0-9][0-9]/[0-9][0-9] [0-9][0-9]:[0-9][0-9]:[0-9][0-9] |
| SAS Server | [0-9][0-9][0-9][0-9]-[0-9][0-9]-[0-9][0-9]T[0-9][0-9]:[0-9][0-9]:[0-9][0-9],[0-9][0-9][0-9] |
| Microservice | [0-9][0-9][0-9][0-9]-[0-9][0-9]-[0-9][0-9] [0-9][0-9]:[0-9][0-9]:[0-9][0-9]\.[0-9][0-9][0-9].* ?[A-Z][A-Z]* |
| Syslog | (?:Jan|Feb|Mar|Apr|May|Ju[In]|Aug|Sep|Oct|Nov|Dec) [0-9][0-9][0-9][0-9-91[0-9][0-9][0-9][0-9] [ˆ ][ˆ ]* [ˆ:] |
| Syslog ISO8601 | [0-9][0-9][0-9][0-9]-[0-9][0-9]-[0-9][0-9]T[0-9][0-9]:[0-9][0-9]:[0-9][0-9]\.[0-9][0-9][0-9][0-9][0-9][0-9]\[\+\-] [0-9][0-9][0-9][0-9][ˆ ][ˆ ]* [ˆ:][ˆ:]*: |
| Web Server | [ˆ ]* [ˆ ]* [ˆ ]* \[[0-9][0-9]/(?:Jan|Feb|Mar|Apr|May|Ju[In]|Aug|Sep|Oct|Nov|Dec)/[0-9][0-9][0-9][0-9]:[0-9][0-9]:[0-9][0-9]:[0-9][0-9]:[0-9][0-9] [\+\-]?[0-9][0-9][0-9][0-9]\] "(?:[\-A-Z]* [ˆ ]* [ˆ"]*[ˆ"]*)" [0-9][0-9][0-9] (?:[0-9][0-9]*|-) |

In operation 234, each updated expression recognizer is combined into an alternate group regular expression to define log recognizer expression 126. For example, each separate recognizer from 1 to N, where N is a number of the log record types is combined. For illustration, recognizer1, recognizer2, . . . , recognizerN is replaced with (?m:ˆ(?( )recognizer1|( )recognizer2| . . . | ( )recognizerN|\z)). Log recognizer expression 126 may be stored to computer-readable medium 108 or another computer-readable medium of a distributed computing system. In addition, or in the alternative, log recognizer expression 126 may be presented on display 116, printed on printer 120, sent to another computing device using communication interface 106, etc. An association is maintained between each separate recognizer from 1 to N even when combined to define log recognizer expression 126 so that a matching expression recognizer can be associated with a regular expression as discussed further below. For example, a numerical position of each separate recognizer from 1 to N may be used as an index into an array or a list of regular expressions.

For illustration, an HTTP web server generated log record may contain the following: 10.122.33.92 - - [24/Oct/207: 13:18:03-0500] "GET /endpoint?parm1=abc&parm2=123 HTTP/1.1" 204 - "Apache-HttpClient/4.5.3 (Java/ 1.8.0_144) perform-service", which includes a timestamp field, a message field, a remote field, a user field, a request (HTTP query) field, and a result (HTTP status) field. The associated regular expression for this log record type may be defined as ˆ([ˆ ]*) [ˆ ]* ([ˆ ]* \[(\d\dV[A-Za-z]{3}V\d{4}: \d\d:\d\d:\d\d [+−]?\d{4})\] "(([A-Z-]*) ([ˆ ]*) ([ˆ ]*))" (\d{3}) (\d+|−)("([ˆ"]*)" "([ˆ"]*)"|)$. The resulting expression recognizer after application of operation 230 may be defined as [ˆ ]* [ˆ ]* [ˆ ]* \[[0-9][0-9]V[A-Za-z][A-Za-z] [A-Za-z]V[0-9][0-9][0-9][0-9]:[0-9][0-9]:[0-9][0-9]:[0-9] [0-9] [+−]? [0-9][0-9][0-9][0-9]\] "[A-Z−]*

For illustration, a Postgres server (configured with log_line_prefix='% m') generated log record may contain the following: 207-10-24 12:24:22.956 EDT HINT: Future log output will appear in directory "/var/log/served/postgres/node0", which includes a timestamp field, a message field, and a level field. The associated regular expression for this log record type may be defined as ^(\d{4}-\d\d-\d\d \d\d:\d\d:\d\d\.\d{3} [A-Z]{3}) ([A-Z]+): (.*)$. The resulting expression recognizer after application of operation 230 may be defined as [0-9][0-9][0-9][0-9]-[0-9][0-9]-[0-9][0-9] [0-9][0-9][0-9][0-9]\. [0-9][0-9][0-9][0-9][0-9] [A-Z][A-Z][A-Z] [A-Z][A-Z]*:.

For illustration, a RabbitMQ server generated log record may contain the following: 2018-07-13 09:42:08.382 [info] <0.286.0>Starting rabbit_node_monitor, which includes a timestamp field, a level field, a process field, and a message field. The associated regular expression for this log record type may be defined as ^(?P<timestamp>\d{4}-\d\d-\d\d \d\d:\d\d:\d\d\.\d{3}) \[(?P<level>[a-z]+)\] (?P<pid><[^>→]*>) (?P<message>.*)$. The resulting expression recognizer after application of operation 230 may be defined as [0-9][0-9][0-9][0-9]-[0-9][0-9]-[0-9][0-9] [0-9][0-9]:[0-9][0-9]:[0-9][0-9]\.[0-9][0-9][0-9] \[[a-z]+\]<.

For illustration, a syslog generated log record may contain the following: Oct 24 10:01:01 server1 run-parts(/etc/cron.hourly)[29604]: starting 0anacron, which includes a timestamp field, a message field, and a local field. The associated regular expression for this log record type may be defined as ^(?P<timestamp>(?:Jan|Feb|Mar|Apr|May|Jun|Jul|Aug|Sep|Oct|Nov|Dec) [ \d]\d \d\d:\d\d:\d\d) (?P<hostname>[^ ]+) (?P<process>[^:]+): (?P<message>.*)$. The resulting expression recognizer after application of operation 230 may be defined as (?:Jan|Feb|Mar|Apr|May|Ju[ln]|Aug|Sep|Oct|Nov|Dec) [0-9][0-9] [0-9][0-9]:[0-9][0-9]:[0-9][0-9] [^ ][^ ]* [^:].

The resulting log recognizer expression 126 can be organized and assembled as: (?m:^(?:( )?:Jan|Feb|Mar|Apr|May|Ju[ln]|Aug|Sep|Oct|Nov|Dec) [0-9][0-9] [0-9][0-9]:[0-9][0-9]:[0-9][0-9] [^ ][^ ]* [^:]|( )[0-9][0-9][0-9][0-9]-[0-9][0-9]-[0-9][0-9] [0-9][0-9]:[0-9][0-9]:[0-9][0-9]\.[0-9][0-9][0-9] \[[a-z]+\] <|( )[0-9][0-9][0-9][0-9]-[0-9][0-9]-[0-9][0-9] [0-9][0-9]:[0-9][0-9]:[0-9][0-9]\.[0-9][0-9][0-9] [A-Z][A-Z][A-Z] [A- Z][A-Z]*:|( ) [^ ]* [^ ]* [^ ]* \|[0-9][0-9]V[A-Za-z][A-Za-z][A-Za-z]V[0-9][0-9][0-9][0-9]:[0- 9][0-9]:[0-9][0-9]:[0-9][0-9] [+–]? [0-9][0-9][0-9][0-9]\|"[A-Z-]*|\z)) for the combination of the syslog generated log record, the RabbitMQ server generated log record, the Postgres server generated log record, and the HTTP server generated log record. The recognition performance of log recognizer expression 126 compared with one built from the four full regular expressions can be two to three times faster and is comparable to log record origin-based identification that is not possible with merged log records. Our experience with a log recognizer expression for thirty log record types is similar.

Figure 3:
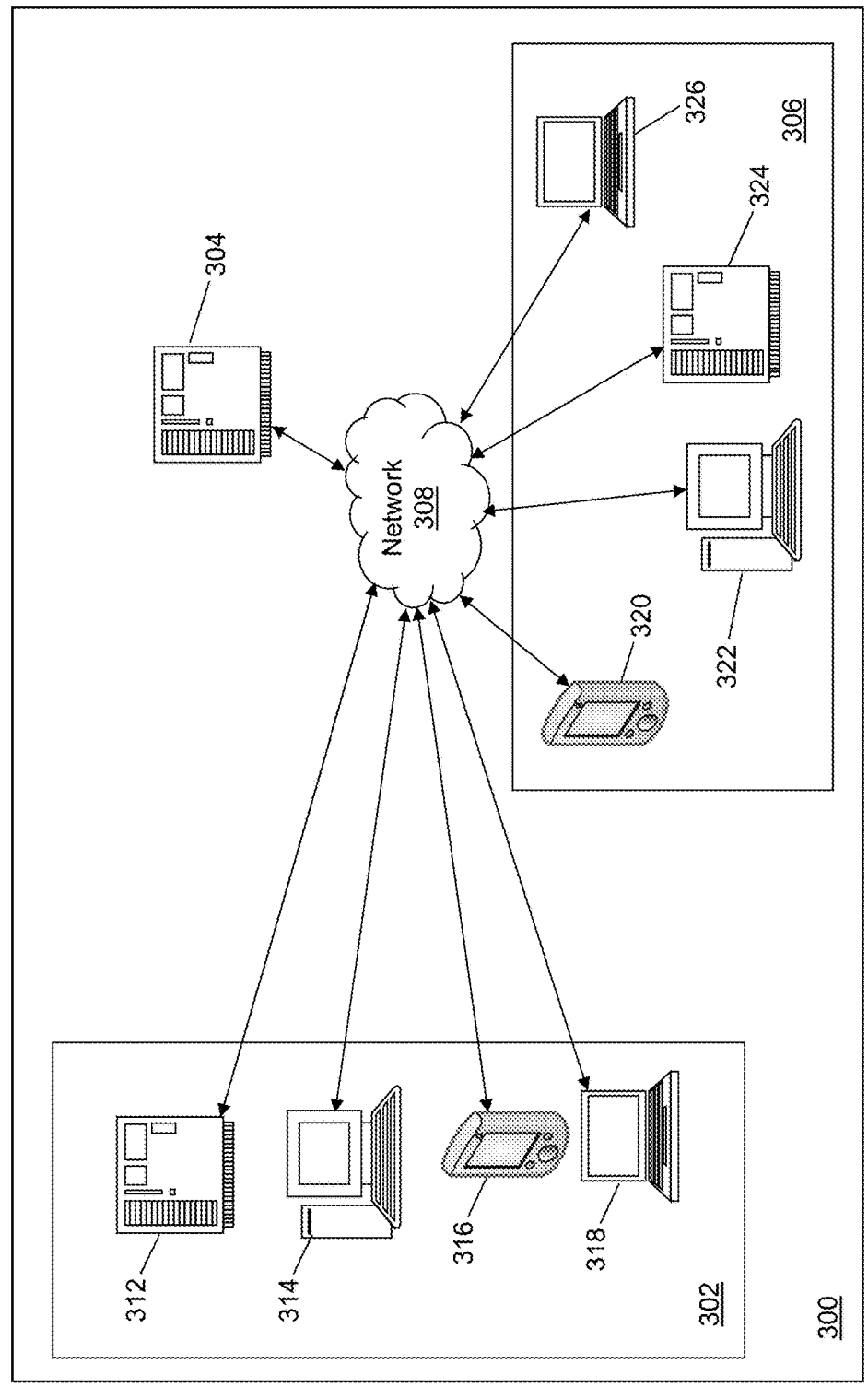
FIG. 3 depicts a block diagram of a stream processing system in accordance with an illustrative embodiment.

Referring to FIG. 3, a block diagram of a stream processing system 300 is shown in accordance with an illustrative embodiment. In an illustrative embodiment, stream processing system 300 may include an event publishing system 302, a log ESP device 304, an event subscribing system 306, and a network 308. Each of event publishing system 302, log ESP device 304, and event subscribing system 306 may be composed of one or more discrete devices in communication through network 308.

Event publishing system 302 includes, is integrated with, and/or communicates with one or more sensors, data generation devices, data capture devices, etc. As an example, a data generation device or a data capture device may be a device that generates a log record in response to occurrence of an event. Event publishing system 302 may publish the log record or otherwise send the log record to log ESP device 304 as an "event" that is a data record that reflects something that has happened. Log ESP device 304 receives the log record optionally in an event stream, processes the log record, and identifies a computing device of event subscribing system 306 to which the processed log record is sent optionally in an event stream.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of event publishing system 302 may include computing devices of any form factor such as a server computer 312, a desktop 314, a smart phone 316, a laptop 318, a personal digital assistant, an integrated messaging device, a tablet computer, a point of sale system, a transaction system, etc. Event publishing system 302 can include any number and any combination of form factors of computing devices that may be organized into subnets. The computing devices of event publishing system 302 send and receive signals through network 308 to/from another of the one or more computing devices of event publishing system 302 and/or to/from log ESP device 304. The one or more computing devices of event publishing system 302 may communicate using various transmission media that may be wired and/or wireless as understood by those skilled in the art. The one or more computing devices of event publishing system 302 may be geographically dispersed from each other and/or co-located. Each computing device of the one or more computing devices of event publishing system 302 may be executing one or more event publishing applications such as an log record publishing application 622 (shown referring to FIG. 6) of the same or different type so that a plurality of different types of log records are generated at various times.

Log ESP device 304 can include any form factor of computing device including a desktop, a laptop, a server, etc. For illustration, FIG. 3 represents log ESP device 304 as a server computer. In general, a server computer may include faster processors, additional processors, more disk memory, and/or more random access memory (RAM) than a client computer and support multi-threading as understood by a person of skill in the art. Log ESP device 304 sends and receives signals through network 308 to/from event publishing system 302 and/or to/from event subscribing system 306. Log ESP device 304 may communicate using various transmission media that may be wired and/or wireless as understood by those skilled in the art. Log ESP device 304 may be implemented on a plurality of computing devices of the same or different type that support failover processing.

The one or more computing devices of event subscribing system 306 may include computers of any form factor such as a smart phone 320, a desktop 322, a server computer 324, a laptop 326, a personal digital assistant, an integrated messaging device, a tablet computer, etc. Event subscribing system 306 can include any number and any combination of form factors of computing devices. The computing devices of event subscribing system 306 send and receive signals through network 308 to/from log ESP device 304. The one or more computing devices of event subscribing system 306 may be geographically dispersed from each other and/or co-located. The one or more computing devices of event subscribing system 306 may communicate using various transmission media that may be wired and/or wireless as understood by those skilled in the art. Each computing device of the one or more computing devices of event subscribing system 102 may be executing one or more event subscribing applications such as an event subscribing application 822 (shown referring to FIG. 8) of the same or different type.

Figure 4:
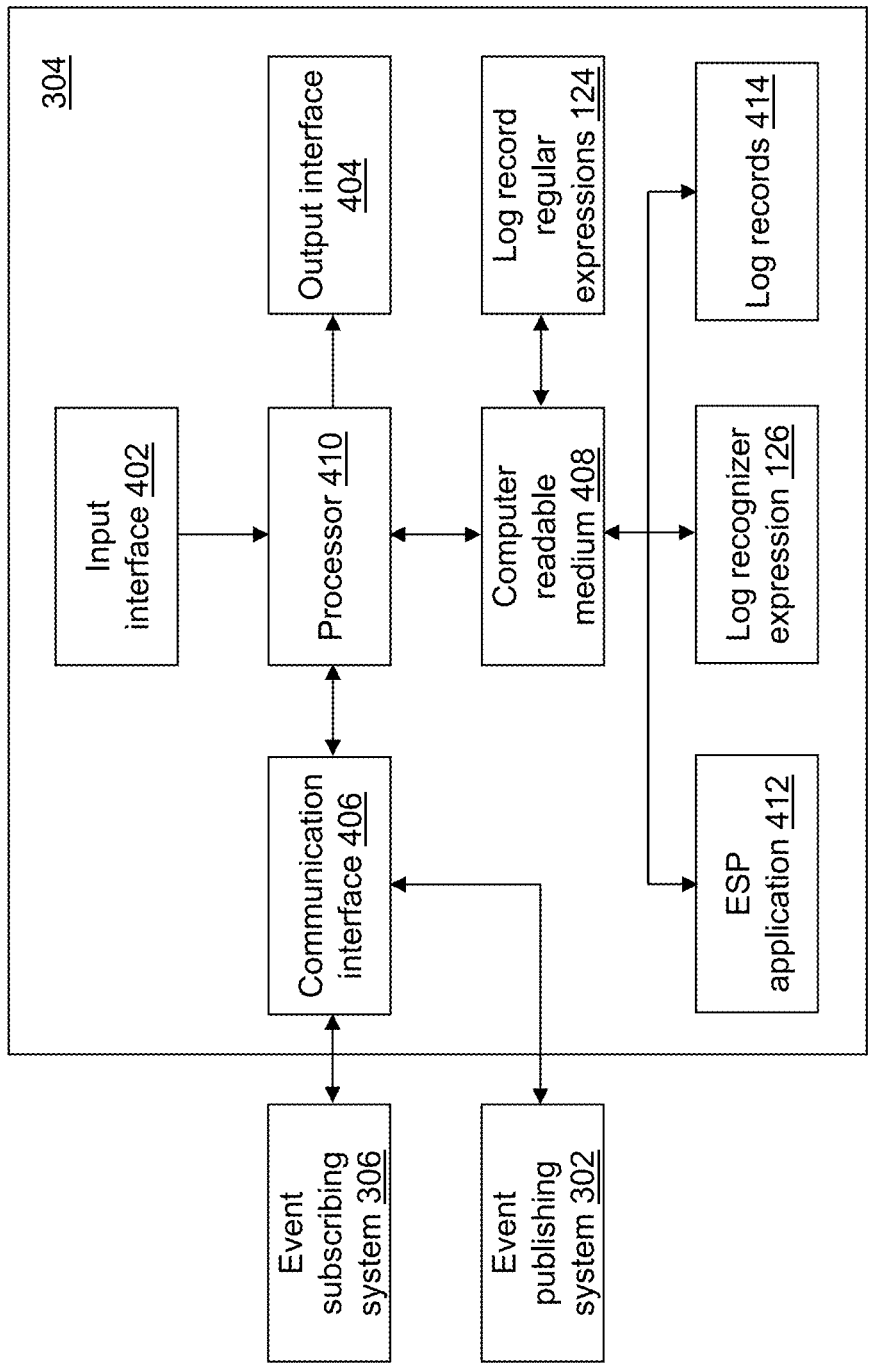
FIG. 4 depicts a block diagram of a log event stream processing device of the stream processing system of FIG. 3 in accordance with an illustrative embodiment.

Referring to FIG. 4, a block diagram of log ESP device 104 is shown in accordance with an illustrative embodiment. Log ESP device 104 may include a second input interface 402, a second output interface 404, a second communication interface 406, a second computer-readable medium 408, a second processor 410, an ESP application 412, log record regular expressions 124, log recognizer expression 126, and log records 414. Fewer, different, or additional components may be incorporated into Log ESP device 104.

Second input interface 402 provides the same or similar functionality as that described with reference to input interface 102 of log recognizer creation device 100 though referring to log ESP device 104. Second output interface 404 provides the same or similar functionality as that described with reference to output interface 104 of log recognizer creation device 100 though referring to log ESP device 104. Second communication interface 406 provides the same or similar functionality as that described with reference to communication interface 106 of log recognizer creation device 100 though referring to log ESP device 104. Data and messages may be transferred between log ESP device 104 and the plurality event publishing system 302 and/or the plurality of event subscribing system 306 using second communication interface 406. Second computer-readable medium 408 provides the same or similar functionality as that described with reference to computer-readable medium 108 of log recognizer creation device 100 though referring to log ESP device 104. Second processor 410 provides the same or similar functionality as that described with reference to processor 110 of log recognizer creation device 100 though referring to log ESP device 104. Log ESP device 104 receives log records 414 from event publishing system 302. Second computer-readable medium 408 may provide the electronic storage medium for log records 414.

ESP application 412 performs operations associated with coordinating and controlling the parsing of information from each log record of log records 414 received from the plurality of event publishing system 302 and with sending the parsed log record to the plurality of event subscribing system 306 based on a subscription request. ESP application 412 may embed an ESP engine (ESPE) with its own dedicated thread pool or pools into its application space where the main application thread can do application-specific work, and the ESPE processes log record streams at least by creating an instance of a model into processing objects. The operations may be implemented using hardware, firmware, software, or any combination of these methods. Referring to the example embodiment of FIG. 4, ESP application 412 is implemented in software (comprised of computer-readable and/or computer-executable instructions) stored in second computer-readable medium 408 and accessible by second processor 410 for execution of the instructions that embody the operations of ESP application 412. ESP application 412 may be written using one or more programming languages, assembly languages, scripting languages, etc. ESP application 412, for example, may be implemented as a Web application. For illustration, ESP application 412 may be integrated with the SAS® Event Stream Processing Engine developed and provided by SAS Institute Inc. of Cary, N.C., USA.

Log records 414 may be generated or captured in response to occurrence of an event or a transaction, generated by a device such as in response to an interaction by a user with the device, etc. Log records 414 may be generated at different time points periodically, intermittently, when an event occurs, etc. One or more field of a log record may include a time value and/or a date value. Log records 414 may be generated at a high data rate. For example, log records 414 may be generated as part of the Internet of Things (IoT), where things (e.g., machines, devices, phones, sensors) can be connected to networks and the data from these things collected and processed within the things and/or external to the things before being stored and/or transmitted as log records 414.

Figure 5A:
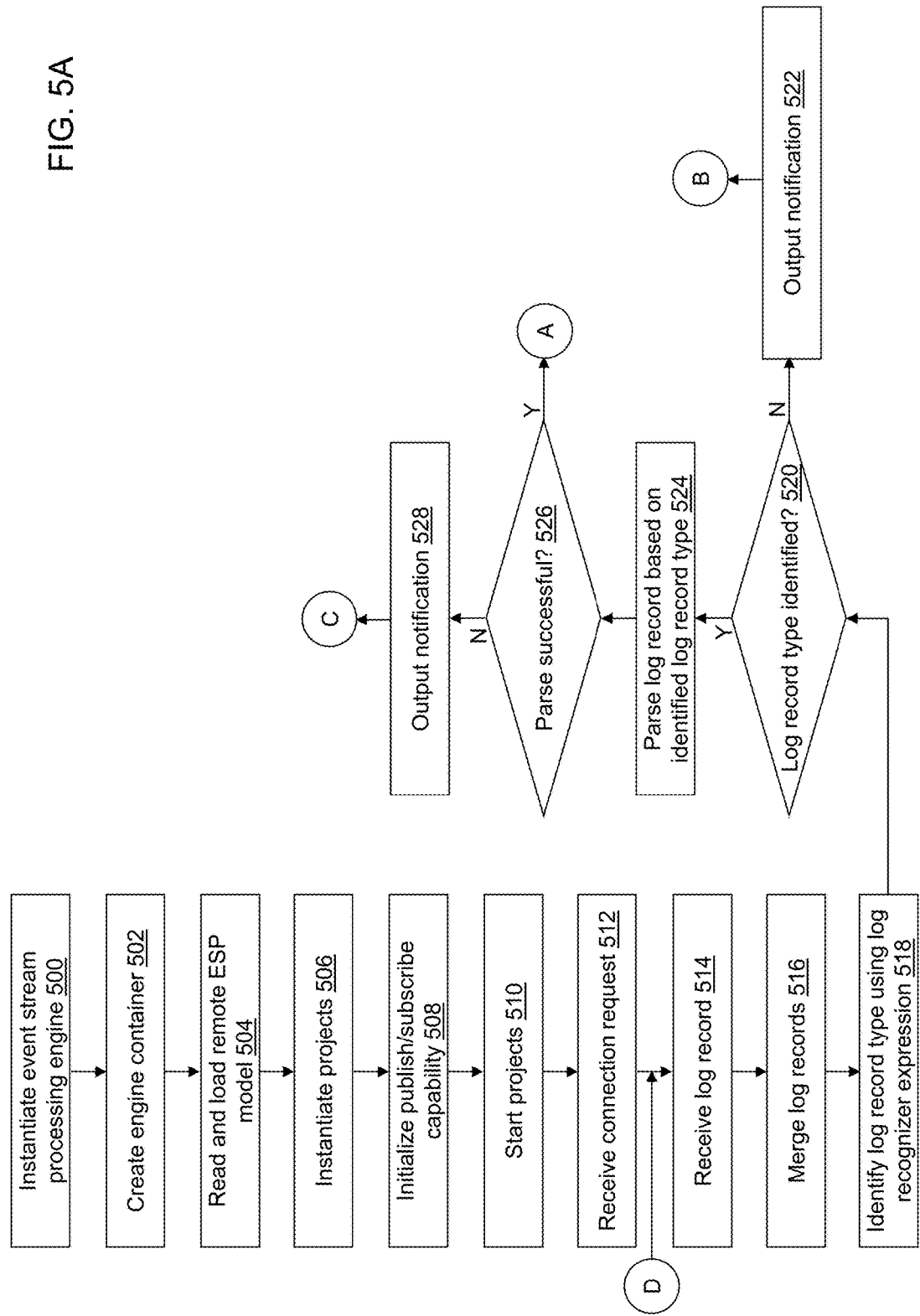
FIGS. 5A and 5B depict a flow diagram illustrating examples of operations performed by the log event stream processing device of FIG. 4 in accordance with an illustrative embodiment.
Figure 5B:
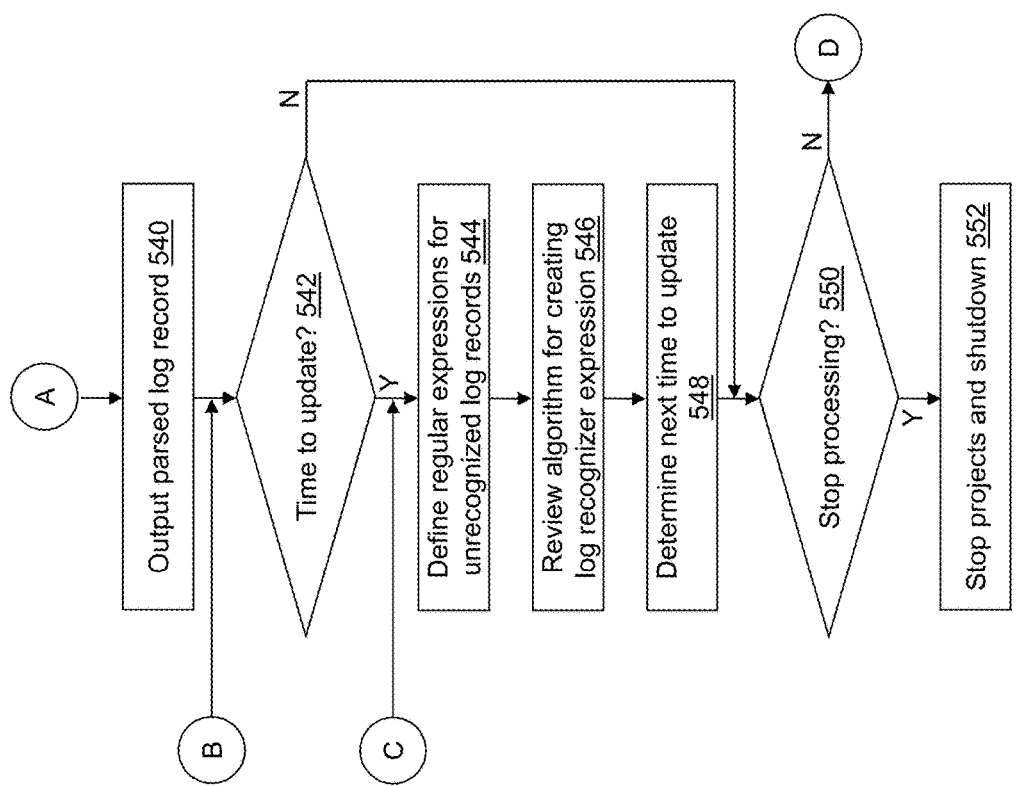

Referring to FIGS. 5A and 5B, a flow diagram illustrating examples of operations performed by log ESP device 304 is shown in accordance with an illustrative embodiment. Additional, fewer, or different operations may be performed depending on the embodiment of ESP application 412. The order of presentation of the operations of FIGS. 5A and 5B is not intended to be limiting. Although some of the operational flows are presented in sequence, the various operations may be performed in various repetitions, concurrently (in parallel, for example, using threads and/or a distributed computing system), and/or in other orders than those that are illustrated. ESP application 412 may be integrated with log recognizer creation application 122.

Figure 10:
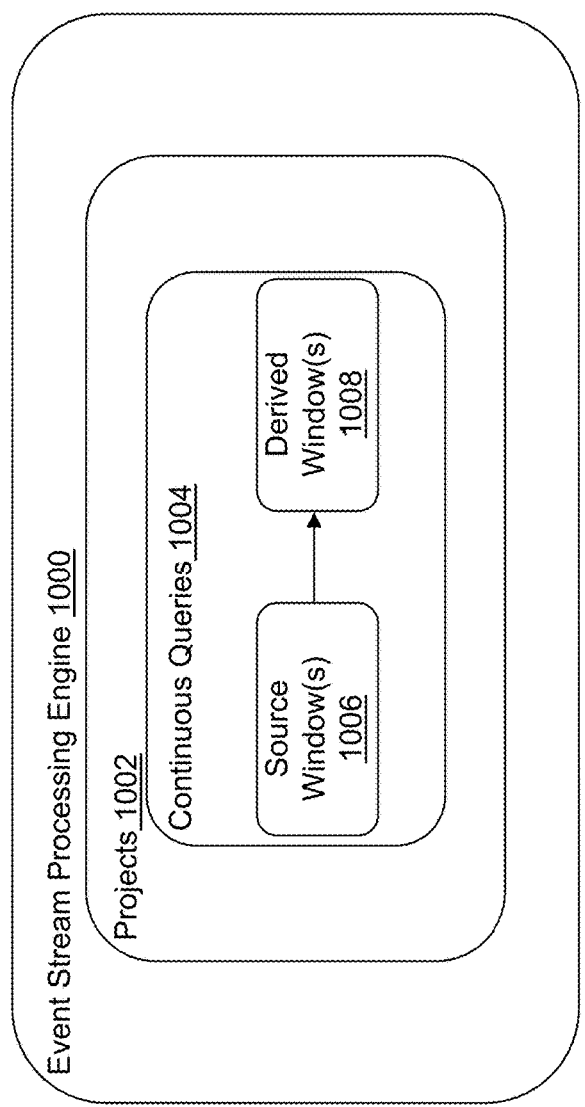
FIG. 10 depicts a block diagram of an ESP engine executing on the log event stream processing device of FIG. 4 in accordance with an illustrative embodiment.

Referring to FIG. 5A, in an operation 500, an ESP engine (ESPE) 1000 (shown referring to FIG. 10) may be instantiated. For example, referring to FIG. 10, the components of ESPE 1000 executing at log ESP device 304 are shown in accordance with an illustrative embodiment. ESPE 1000 may include one or more projects 1002. A project may be described as a second-level container in an engine model managed by ESPE 1000 where a thread pool size for the project may be defined by a user. A value of one for the thread pool size indicates that writes are single-threaded. Each project of the one or more projects 1002 may include one or more continuous queries 1004 that contain data flows, which are data transformations of incoming event streams that may include log records 414. The one or more continuous queries 1004 may include one or more source windows 1006 and one or more derived windows 1008.

The engine container is the top-level container in a model that manages the resources of the one or more projects 1002. Each ESPE 1000 has a unique engine name. Additionally, the one or more projects 1002 may each have unique project names, and each query may have a unique continuous query name and begin with a uniquely named source window of the one or more source windows 1006. Each ESPE 1000 may or may not be persistent.

An event block object may be described as a grouping or package of one or more event objects. An event stream may be described as a flow of event block objects. A continuous query of the one or more continuous queries 1004 transforms the incoming event stream made up of streaming event block objects published into ESPE 1000 into one or more outgoing event streams using the one or more source windows 1006 and the one or more derived windows 1008. A continuous query can also be thought of as data flow modeling. The one or more source windows 1006 are at the top of the directed graph and have no windows feeding into them. Event streams are published into the one or more source windows 1006, and from there, the event streams are directed to the next set of connected windows as defined by the directed graph. The one or more derived windows 1008 are all instantiated windows that are not source windows and that have other windows streaming events into them. The one or more derived windows 1008 perform computations or transformations on the incoming event streams. The one or more derived windows 1008 transform event streams based on the window type (that is operators such as join, filter, compute, aggregate, copy, pattern match, procedural, union, etc.) and window settings. As event streams are published into ESPE 1000, they are continuously queried, and the resulting sets of derived windows in these queries are continuously updated.

Referring again to FIG. 5A, in an operation 502, the engine container may be created. For illustration, ESPE 1000 may be instantiated using a function call that specifies the engine container as a manager for the model. The function call may include the engine name for ESPE 1000 that may be unique to ESPE 1000.

In an operation 504, an ESP model that may be stored locally to second non-transitory computer-readable medium 408 may be read and loaded.

In an operation 506, the one or more projects 402 defined by the ESP model may be instantiated. Instantiating the one or more projects 1002 also instantiates the one or more continuous queries 1004, the one or more source windows 1006, and the one or more derived windows 1008 defined from the ESP model. Based on the ESP model, ESPE 1000 may analyze and process events in motion or event streams that include log records 414. Instead of storing events and running queries against the stored events, ESPE 1000 may store queries and stream events through them to allow continuous analysis of log record 414 as they are received. The one or more source windows 1006 and the one or more derived windows 1008 defined from the ESP model may be created based on the described processing.

In an operation 508, a publish/subscribe (pub/sub) capability may be initialized for ESPE 1000. In an illustrative embodiment, the pub/sub capability is initialized for each project of the one or more projects 1002. Pub/sub is a message-oriented interaction paradigm based on indirect addressing. Processed data recipients (event subscribing system 306) specify their interest in receiving information from ESPE 1000 by subscribing to specific classes of events, while information sources (event publishing system 302) publish events to ESPE 1000 without directly addressing the data recipients.

To initialize and enable pub/sub capability for ESPE 1000, a host name and a port number are provided. The host name and the port number of may be read from the ESP model. Pub/sub clients can use a host name and the port number of log ESP device 304 to establish pub/sub connections to ESPE 1000. For example, a server listener socket is opened for the port number to enable event subscribing system 306 to connect to ESPE 1000 for pub/sub services. The host name and the port number of Log ESP device 304 to establish pub/sub connections to ESPE 1000 may be referred to as the host:port designation of ESPE 1000 executing on Log ESP device 304.

In an operation 510, the one or more projects 1002 defined from the ESP model may be started. The one or more started projects may run in the background on log ESP device 304.

In an operation 512, a connection request may be received from one or more computing device of event publishing system 302 for a source window to which data will be published. A connection request further may be received from one or more computing device of event subscribing system 306.

In an operation 514, a log record is received from an event publishing device 600 (shown referring to FIG. 6) of event publishing system 302. An event block object containing one or more log records may be injected into a source window of the one or more source windows 1006 defined from the ESP model. The received log record may be processed through the one or more continuous queries 1004 that include one or more operations of operations 516 to 548.

In an operation 516, the one or more computing devices of event publishing system 302 define disparate sources that generate different types of log records that are merged into a common stream of log records 414.

In an operation 518, a log record type of a log record selected from the merged log records 414 is identified using the alternate group log recognizer expression 126. The regular expression parser returns the index of the alternate that matches. This index identifies the log record type among the alternates in the log recognizer expression 126. For illustration, any regular expression parser (e.g., the UNIX grep command, the Perl scripting language, the Golang regexp package) can be used.

In an operation 520, a determination is made concerning whether or not a log record type was identified in operation 518. When a log record type was identified in operation 518, processing continues in an operation 524. When a log record type was not identified in operation 518, processing continues in an operation 522. For example, a log record type may not be identified in operation 518 if no matching expression recognizer is identified from any expression recognizer included in log recognizer expression 126.

Optionally, when a log record type was not identified in operation 518, the received log record may be interpreted to be "detail" (for example, a multiline log record or a diagnostic trace-back) from a prior log record type and appended to that log event.

In operation 522, a notification is output that indicates that the log record is "unrecognized". The notification may include the log record, a time/date, etc. and may be output for storage to second non-transitory computer-readable medium 308. In addition, or in the alternative, the notification may be output for presentation on a display, printed on a printer, sent to a computing device of event subscribing system 306 using communication interface 106, etc. After outputting the notification, processing continues in an operation 542 shown referring to FIG. 5B.

In operation 524, the received log record is parsed using the regular expression associated with the identified log record type. Regular expression parsing results either in success, where the expression matches the log record and all groups are captured, or in failure.

In an operation 526, the outcome of parsing in operation 524 is evaluated. When the log record is successfully parsed in operation 524, processing continues in an operation 540 shown referring to FIG. 5B. When the log record parsing fails in operation 524, processing continues in an operation 528.

In operation 528, a notification is output that indicates that the log record "parsing failed". The notification may include the log record, a time/date, etc. and may be output for storage to second non-transitory computer-readable medium 408. In addition, or in the alternative, the notification may be output for presentation on a display, printed on a printer, sent to a computing device of event subscribing system 306 using second communication interface 406, etc. After outputting the notification, processing continues in an operation 544 shown referring to FIG. 5B.

Referring to FIG. 5B, in operation 540, the parsed log record is output. The parsed log record may be output for storage to second non-transitory computer-readable medium 308. In addition, or in the alternative, the parsed log record may be output for presentation on a display, printed on a printer, sent to a computing device of event subscribing system 306 using second communication interface 406, etc.

In operation 542, a determination is made concerning whether or not it is time to update log recognizer expression 126. When it is time to update log recognizer expression 126, processing continues in operation 544. When it is not time to update log recognizer expression 126, processing continues in an operation 550. For example, log recognizer expression 126 may be updated periodically.

In operation 544, log records not recognized in operation 522 are examined to determine what updates or additions to make to log record regular expressions 124.

In an operation 546, the log record regular expression parsing failures output in operation 528 are examined, and updates to log record regular expressions 124 and refinements for the log recognizer creation application 122 are made. Log recognizer creation application 122 may be executed again to update log recognizer expression 126.

In an operation 548, a next time to update log recognizer expression 126 is determined, for example, by adding an update time period value to a current time.

In operation 550, a determination is made concerning whether or not processing is stopped. If processing is not stopped, processing continues in operation 514 to continue receiving log records 414 from event publishing system 302. If processing is stopped, processing continues in an operation 552.

In operation 552, the started projects are stopped, and ESPE 1000 is shutdown.

Each log record has the appropriate regular expression applied to extract its fields and to produce a log event based on the log record type identified using log recognizer expression 126. Inserting these events into a database, with the field values as indices, facilitates search and merge operations with other events, enabling timely recognition of issues occurring in a large system. Log recognizer creation application 122 integrated with ESP application 412 reduces the complex code (regex pattern recognizer) needed to process each log record and improves performance by identifying the log record type on a merged event stream. Using log record type improves the throughput of log record streaming into log events by as at least a factor of two to three allowing events to be merged and processed in uniform time without needing knowledge of an origin of the log record.

Figure 6:
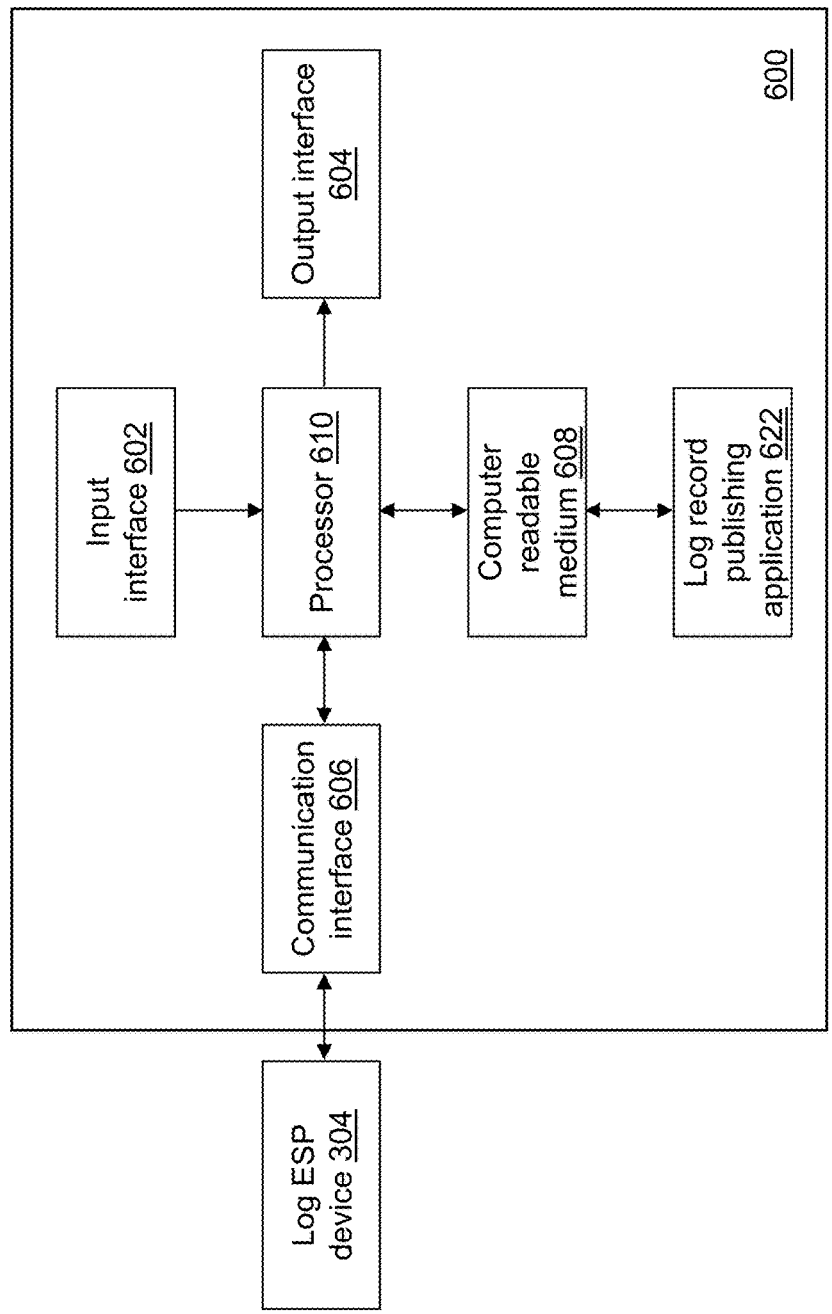
FIG. 6 depicts a block diagram of a log event publishing device of a log event publishing system of the log event stream processing system of FIG. 4 in accordance with an illustrative embodiment.

Referring to FIG. 6, a block diagram of event publishing device 600 of event publishing system 302 is shown in accordance with an example embodiment. Event publishing device 600 is an example computing device of event publishing system 302. For example, each of server computer 312, desktop 314, smart phone 316, and laptop 318 may be an instance of event publishing device 600. Event publishing device 600 may include a third input interface 602, a third output interface 604, a third communication interface 606, a third computer-readable medium 608, a third processor 610, and a log record publishing application 622. Each event publishing device 600 of event publishing system 302 may include the same or different components and combinations of components. Fewer, different, and additional components may be incorporated into event publishing device 600.

Third input interface 602 provides the same or similar functionality as that described with reference to input interface 102 of log recognizer creation device 100 though referring to event publishing device 600. Third output interface 604 provides the same or similar functionality as that described with reference to output interface 104 of log recognizer creation device 100 though referring to event publishing device 600. Third communication interface 606 provides the same or similar functionality as that described with reference to communication interface 106 of log recognizer creation device 100 though referring to event publishing device 600. Data and messages may be transferred between event publishing device 600 and log ESP device 304 using third communication interface 606. Third computer-readable medium 608 provides the same or similar functionality as that described with reference to computer-readable medium 108 of log recognizer creation device 100 though referring to event publishing device 600. Third processor 610 provides the same or similar functionality as that described with reference to processor 110 of log recognizer creation device 100 though referring to event publishing device 600.

Log record publishing application 622 performs operations associated with generating, capturing, and/or receiving log records and publishing the log records possibly in an event stream to log ESP device 304. The operations may be implemented using hardware, firmware, software, or any combination of these methods. Referring to the example embodiment of FIG. 6, log record publishing application 622 is implemented in software (comprised of computer-readable and/or computer-executable instructions) stored in third computer-readable medium 608 and accessible by third processor 610 for execution of the instructions that embody the operations of log record publishing application 622. Log record publishing application 622 may be written using one or more programming languages, assembly languages, scripting languages, etc. Log record publishing application 622 may be implemented as a Web application.

Figure 7:
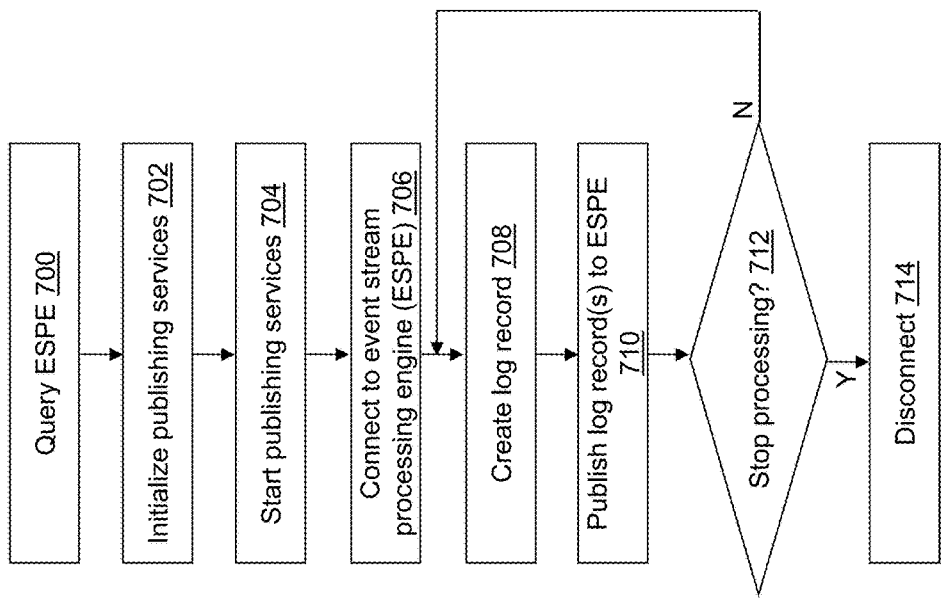
FIG. 7 depicts a flow diagram illustrating examples of operations performed by the log event publishing device of FIG. 6 in accordance with an illustrative embodiment.

Referring to FIG. 7, example operations associated with log record publishing application 622 are described. Additional, fewer, or different operations may be performed depending on the embodiment. The order of presentation of the operations of FIG. 7 is not intended to be limiting. A user can interact with one or more user interface windows presented to the user in a display under control of log record publishing application 622 independently or through a browser application in an order selectable by the user. Although some of the operational flows are presented in sequence, the various operations may be performed in various repetitions, concurrently, and/or in other orders than those that are illustrated. For example, a user may execute log record publishing application 622, which causes presentation of a first user interface window, which may include a plurality of menus and selectors such as drop down menus, buttons, text boxes, hyperlinks, etc. associated with log record publishing application 622 as understood by a person of skill in the art. As further understood by a person of skill in the art, various operations may be performed in parallel, for example, using a plurality of threads or a plurality of computing devices such as a grid or a cloud of computing devices.

In an operation 700, ESPE 1000 may be queried, for example, to discover projects 1002, continuous queries 1004, windows 1006, 1008, window schema, and window edges currently running in ESPE 1000.

In an operation 702, publishing services may be initialized.

In an operation 704, the initialized publishing services may be started, which may create a publishing client for the instantiated log record publishing application 622. The publishing client performs the various pub/sub activities for the instantiated log record publishing application 622.

In an operation 706, a connection may be made between log record publishing application 622 and ESPE 1000 for each source window of the source windows 1006 to which any log record is published.

In an operation 708, an event block object may be created by log record publishing application 622 that includes one or more log records. The event block object may include a plurality of measurement data values measured at different times and/or by different devices.

In an operation 710, the created event block object is published to ESPE 1000.

In an operation 712, a determination is made concerning whether or not processing is stopped. If processing is not stopped, processing continues in operation 708 to continue creating and publishing event block objects that include log records. If processing is stopped, processing continues in an operation 714.

In operation 714, the connection made between log record publishing application 622 and ESPE 1000 through the created publishing client is disconnected, and each started publishing client is stopped.

Figure 8:
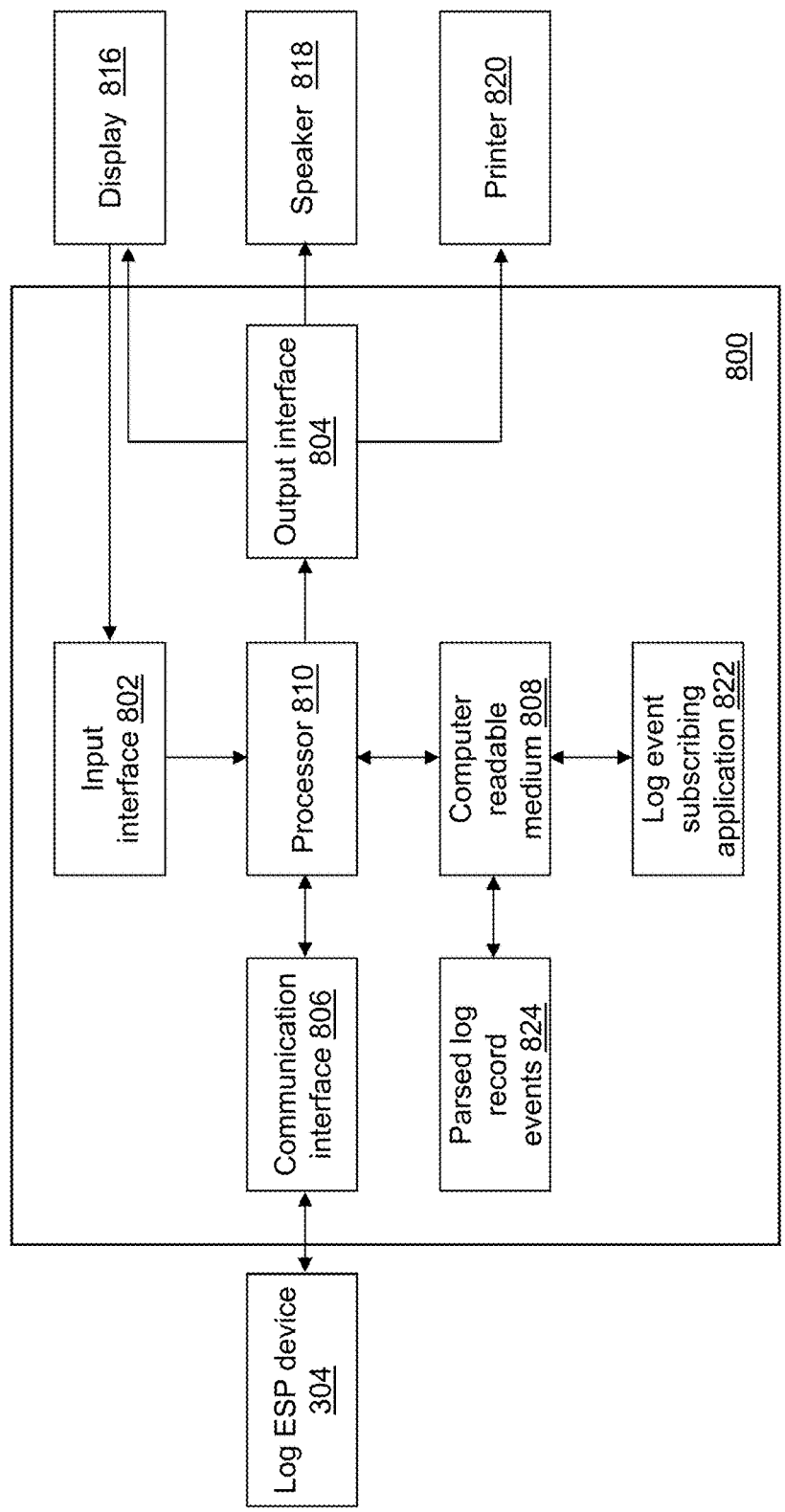
FIG. 8 depicts a block diagram of a log event subscribing device of a log event subscribing system of the log event stream processing system of FIG. 4 in accordance with an illustrative embodiment.

Referring to FIG. 8, a block diagram of event subscribing device 800 is shown in accordance with an example embodiment. Event subscribing device 800 is an example computing device of event subscribing system 306. For example, each of smart phone 320, desktop 322, server computer 324, and laptop 326 may be an instance of event subscribing device 800. Event subscribing device 800 may include a fourth input interface 802, a fourth output interface 804, a fourth communication interface 806, a fourth computer-readable medium 808, a fourth processor 810, and a log event subscribing application 822. Fewer, different, and additional components may be incorporated into event subscribing device 800. Each event subscribing device 800 of event subscribing system 306 may include the same or different components or combination of components.

Fourth input interface 802 provides the same or similar functionality as that described with reference to input interface 102 of log recognizer creation device 100 though referring to event subscribing device 800. Fourth output interface 804 provides the same or similar functionality as that described with reference to output interface 104 of log recognizer creation device 100 though referring to event subscribing device 800. Fourth communication interface 806 provides the same or similar functionality as that described with reference to communication interface 106 of log recognizer creation device 100 though referring to event subscribing device 800. Data and messages may be transferred between event subscribing device 800 and log ESP device 304 using fourth communication interface 806. Fourth computer-readable medium 808 provides the same or similar functionality as that described with reference to computer-readable medium 108 of log recognizer creation device 100 though referring to event subscribing device 800. Fourth processor 810 provides the same or similar functionality as that described with reference to processor 110 of log recognizer creation device 100 though referring to event subscribing device 800.

Log event subscribing application 822 performs operations associated with receiving parsed log events received from log ESP device 304 possibly in an event stream to. The operations may be implemented using hardware, firmware, software, or any combination of these methods. Referring to the example embodiment of FIG. 8, log event subscribing application 822 is implemented in software (comprised of computer-readable and/or computer-executable instructions) stored in fourth computer-readable medium 608 and accessible fourth third processor 610 for execution of the instructions that embody the operations of log event subscribing application 822. Log event subscribing application 822 may be written using one or more programming languages, assembly languages, scripting languages, etc. Log event subscribing application 822 may be implemented as a Web application.

Figure 9:
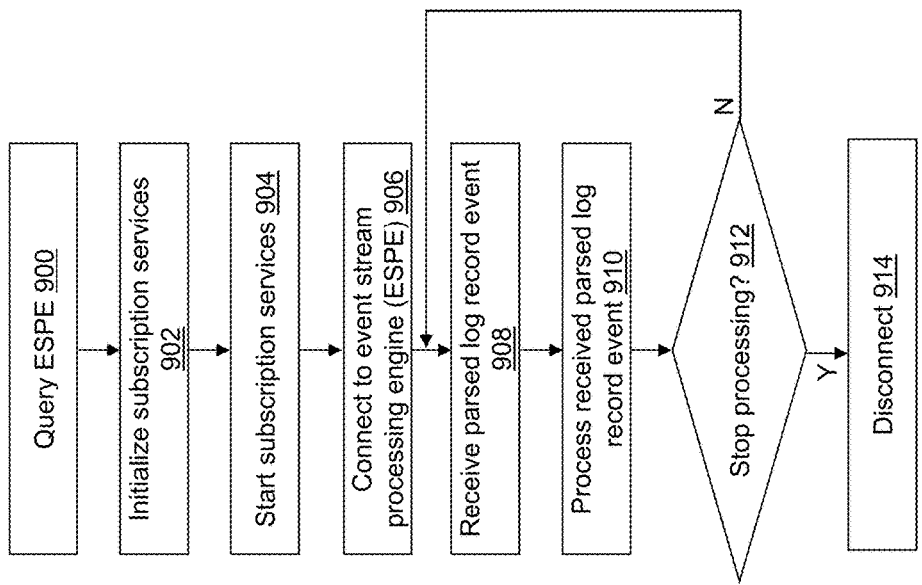
FIG. 9 depicts a flow diagram illustrating examples of operations performed by the log event subscribing device of FIG. 8 in accordance with an illustrative embodiment.

Referring to FIG. 9, example operations associated with log event subscribing application 822 are described. Additional, fewer, or different operations may be performed depending on the embodiment. The order of presentation of the operations of FIG. 9 is not intended to be limiting.

Similar to operation 700, in an operation 900, ESPE 1000 may be queried, for example, to discover names of projects 1002, of continuous queries 1004, of windows 1006, 1008, of window schema, and of window edges currently running in ESPE 1000.

In an operation 902, subscription services may be initialized.

In an operation 904, the initialized subscription services may be started, which may create a subscribing client on behalf of log event subscribing application 822 at event subscribing device 800.

In an operation 906, a connection may be made between log event subscribing application 822 executing at event subscribing device 800 and ESPE 1000 through the created subscribing client.

In an operation 908, a parsed log record event is received by log event subscribing application 822 executing at event subscribing device 800.

In an operation 910, the received, parsed log record event is processed based on the operational functionality provided by log event subscribing application 822. For example, log event subscribing application 822 may store the parsed log record event in parsed log record events 824, and/or extract data from the received, parsed log record event and store the extracted data in parsed log record events 824. Parsed log record events 824 may be stored using various formats as known to those skilled in the art including a relational database, a system of tables, a structured query language database, etc. In addition, or in the alternative, log event subscribing application 822 may extract data from the received, parsed log record event and send the extracted data to a system control operator display system, an automatic control system, a notification device, an analytic device, etc. Log event subscribing application 822 may perform any number of different types of actions as a result of extracting data from the received, parsed log record event. The action may involve presenting information on a second display 816 or a second printer 820, presenting information using a second speaker 818, storing data in fourth computer-readable medium 808, sending information to another device using fourth communication interface 806, etc.

In an operation 912, a determination is made concerning whether or not processing is stopped. If processing is not stopped, processing continues in operation 908 to continue receiving and processing parsed log record events 824. If processing is stopped, processing continues in an operation 914.

In operation 914, the connection made between log event subscribing application 822 and ESPE 1000 through the subscribing client is disconnected, and the subscribing client is stopped.

A comparison in computation time between an existing algorithm that uses the regular expressions themselves to identify and parse the log record type and log ESP application 412 using log recognizer expression 126 created using log recognizer creation application 122 was performed. In the tests, a set of log files containing about three million log records was parsed using thirty regular expressions, including the nine regular expressions defined in Table 1. The total measured CPU time using the existing algorithm required 12 minutes and 30 seconds to parse the log records. The total measured CPU time using log ESP application 412 with log recognizer expression 126 created using log recognizer creation application 122 required 3 minutes and 45 seconds, which is a three-fold improvement in the time required to parse the three million log event records.

Merging the log records at a time of recording rather than after each log record's processing, reduces a need to reorder log record events by event time after processing, simplifies a redundancy/failover because a single instance log processor is used instead of multiple, and increases a likelihood of discovering meaningful correlations among events. Log recognizer creation application 122 generated an efficient log recognizer expression 126 that enables merging of events co-temporally while minimizing the overhead of format-based identification, streamlines the process for new record types, facilitates integration with databases and downstream processors, enables a more holistic perspective of log event data and reveals common abstractions among log record types.

Implementing some examples of the present disclosure at least in part by using the above-described machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   receive a plurality of log record type regular expressions, wherein each log record type regular expression of the plurality of log record type regular expressions describes a pattern of text included for a log record type associated with each log record type regular expression;
   select a log record type regular expression from the plurality of log record type regular expressions;
   (a) separate the selected log record type regular expression into subexpressions;
   (b) normalize each subexpression of the subexpressions;
   (c) reassemble each normalized subexpression into an expression recognizer for the log record type associated with the selected log record type regular expression;
   (d) repeat (a) to (c) with each remaining log record type regular expression of the plurality of log record type regular expressions selected as the log record type regular expression;
   (e) read the expression recognizer for each of the plurality of log record type regular expressions into a data structure;
   (f) determine an expression operator for each subexpression of each read expression recognizer;
   (g) sort the read recognizer expressions based on an order associated with the determined expression operator for each subexpression of each read expression recognizer;
   (h) create a log recognizer expression from each read expression recognizer included in the sorted read recognizer expressions;
   (i) receive a log record;
   (j) identify the log record type of the received log record using the created log recognizer expression;
   (k) select a log record type regular expression associated with the identified log record type;
   (l) parse the received log record using the selected log record type regular expression; and
   (m) output the parsed, received log record.

2. The non-transitory computer-readable medium of claim 1, wherein the log recognizer expression is defined by combining each read expression recognizer included in the sorted read recognizer expressions in an alternate group regular expression.

3. The non-transitory computer-readable medium of claim 1, further comprising, after (a) and before (b), computer-readable instructions that when executed by the computing device cause the computing device to remove a capture group from each subexpression of the subexpressions, wherein removing the capture group is repeated in (d).

4. The non-transitory computer-readable medium of claim 1, wherein the expression operator for each subexpression of each read expression recognizer is determined to be one of a literal expression, a character class expression, an alternate group expression, or an any character expression.

5. The non-transitory computer-readable medium of claim 4, wherein the read recognizer expressions are sorted from most strict to least strict based on the order associated with the determined expression operator.

6. The non-transitory computer-readable medium of claim 5, wherein the order of the literal expression is most strict, the order of the alternate group expression is second most strict, the order of the character class expression is third most strict, and the order of the any character expression is least strict.

7. The non-transitory computer-readable medium of claim 1, further comprising, after (a) and before (c), computer-readable instructions that when executed by the computing device cause the computing device to determine the expression operator of each subexpression of the subexpressions, wherein determining the expression operator is repeated in (d).

8. The non-transitory computer-readable medium of claim 7, wherein the expression operator of each subexpression of the subexpressions is determined to be one of a literal expression, a character class expression, an alternate group expression, or an any character expression.

9. The non-transitory computer-readable medium of claim 8, further comprising, after (b) and before (c), computer-readable instructions that when executed by the computing device cause the computing device to replace any subexpression of the subexpressions determined as being the alternate group expression and including an empty match with ".*?", wherein replacing any subexpression is repeated in (d).

10. The non-transitory computer-readable medium of claim 8, further comprising, after (c) and before (d), computer-readable instructions that when executed by the computing device cause the computing device to remove any trailing subexpression determined as being a character class expression, wherein removing any trailing subexpression is repeated in (d).

11. The non-transitory computer-readable medium of claim 1, further comprising, after (h), computer-readable instructions that when executed by the computing device cause the computing device to store the created log recognizer expression to the non-transitory computer-readable medium.

12. The non-transitory computer-readable medium of claim 1, further comprising, after (g) and before (h), computer-readable instructions that when executed by the computing device cause the computing device to:
(n) read adjacent recognizer expressions to a second recognizer expression in order from the sorted read recognizer expressions;
(o) compare adjacent recognizer expressions using each subexpression of the associated expression recognizer;
(p) remove trailing subexpressions from the associated expression recognizer when the expression operator between subexpressions of the compared adjacent recognizer expressions is distinct; and
(q) repeat (n) to (p) for each remaining recognizer expression as the second recognizer expression exclusive of a last recognizer expression.

13. The non-transitory computer-readable medium of claim 1, wherein the log record is received from one of a plurality of log event publishing devices.

14. The non-transitory computer-readable medium of claim 1, wherein the parsed, received log record is output by streaming the parsed, received log record to a log event subscribing device.

15. The non-transitory computer-readable medium of claim 1, wherein (i) to (m) is repeated for a plurality of log records received from a plurality of log event publishing devices, wherein the identified log record type is different for at least two log records of the plurality of log records.

16. The non-transitory computer-readable medium of claim 1, further comprising, when the log record type is not identified in (j), computer-readable instructions that when executed by the computing device cause the computing device to output a notification indicating that the log record type was not recognized and to skip (k), (l), and (m).

17. The non-transitory computer-readable medium of claim 16, further comprising, after (m), computer-readable instructions that when executed by the computing device cause the computing device to:
determine when it is time to update the created log recognizer expression; and
when it is determined time to update the created log recognizer expression, update the created log recognizer expression based on any received log record indicated as not recognized.

18. The non-transitory computer-readable medium of claim 1, further comprising, when the log record type is not successfully parsed in (l), computer-readable instructions that when executed by the computing device cause the computing device to output a notification indicating that the log record was not successfully parsed and to skip (k), (l), and (m).

19. The non-transitory computer-readable medium of claim 18, further comprising, after (m), computer-readable instructions that when executed by the computing device cause the computing device to:
determine when it is time to update the created log recognizer expression; and
when it is determined time to update the created log recognizer expression, update the created log recognizer expression based on any received log record indicated as not successfully parsed.

20. A computing device comprising:
a processor; and
a non-transitory computer-readable medium operably coupled to the processor, the computer-readable medium having computer-readable instructions stored thereon that, when executed by the processor, cause the computing device to
receive a plurality of log record type regular expressions, wherein each log record type regular expression of the plurality of log record type regular expressions describes a pattern of text included for a log record type associated with each log record type regular expression;
select a log record type regular expression from the plurality of log record type regular expressions;
(a) separate the selected log record type regular expression into subexpressions;
(b) normalize each subexpression of the subexpressions;
(c) reassemble each normalized subexpression into an expression recognizer for the log record type associated with the selected log record type regular expression;
(d) repeat (a) to (c) with each remaining log record type regular expression of the plurality of log record type regular expressions selected as the log record type regular expression;
(e) read the expression recognizer for each of the plurality of log record type regular expressions into a data structure;
(f) determine an expression operator for each subexpression of each read expression recognizer;

(g) sort the read recognizer expressions based on an order associated with the determined expression operator for each subexpression of each read expression recognizer;

(h) create a log recognizer expression from each read expression recognizer included in the sorted read recognizer expressions;

(i) receive a log record;

(j) identify the log record type of the received log record using the created log recognizer expression;

(k) select a log record type regular expression associated with the identified log record type;

(l) parse the received log record using the selected log record type regular expression; and (m) output the parsed, received log record.

21. A method of automatically creating a log record recognizer expression and using the created log record recognizer expression to identify a log record type for a log record to parse the log record, the method comprising:

receiving a plurality of log record type regular expressions, wherein each log record type regular expression of the plurality of log record type regular expressions describes a pattern of text included for a log record type associated with each log record type regular expression;

selecting, by a computing device, a log record type regular expression from the plurality of log record type regular expressions;

(a) separating, by the computing device, the selected log record type regular expression into subexpressions;

(b) normalizing, by the computing device, each subexpression of the subexpressions;

(c) reassembling, by the computing device, each normalized subexpression into an expression recognizer for the log record type associated with the selected log record type regular expression;

(d) repeating, by the computing device, (a) to (c) with each remaining log record type regular expression of the plurality of log record type regular expressions selected as the log record type regular expression;

(e) reading, by the computing device, the expression recognizer for each of the plurality of log record type regular expressions into a data structure;

(f) determining, by the computing device, an expression operator for each subexpression of each read expression recognizer;

(g) sorting, by the computing device, the read recognizer expressions based on an order associated with the determined expression operator for each subexpression of each read expression recognizer;

(h) creating, by the computing device, a log recognizer expression from each read expression recognizer included in the sorted read recognizer expressions;

(i) receiving a log record;

(j) identifying, by the computing device, the log record type of the received log record using the created log recognizer expression;

(k) selecting, by the computing device, a log record type regular expression associated with the identified log record type;

(l) parsing, by the computing device, the received log record using the selected log record type regular expression; and (m) outputting, by the computing device, the parsed, received log record.

22. The method of claim 21, wherein the log recognizer expression is defined by combining each read expression recognizer included in the sorted read recognizer expressions in an alternate group regular expression.

23. The method of claim 21, further comprising, after (a) and before (b), removing, by the computing device, a capture group from each subexpression of the subexpressions, wherein removing the capture group is repeated in (d).

24. The method of claim 21, wherein the expression operator for each subexpression of each read expression recognizer is determined to be one of a literal expression, a character class expression, an alternate group expression, or an any character expression.

25. The method of claim 24, wherein the read recognizer expressions are sorted from most strict to least strict based on the order associated with the determined expression operator.

26. The method of claim 25, wherein the order of the literal expression is most strict, the order of the alternate group expression is second most strict, the order of the character class expression is third most strict, and the order of the any character expression is least strict.

27. The method of claim 21, further comprising, after (a) and before (c), determining, by the computing device, the expression operator of each subexpression of the subexpressions, wherein determining the expression operator is repeated in (d).

28. The method of claim 27, wherein the expression operator of each subexpression of the subexpressions is determined to be one of a literal expression, a character class expression, an alternate group expression, or an any character expression.

29. The method of claim 28, further comprising, after (c) and before (d), removing, by the computing device, any trailing subexpression determined as being a character class expression, wherein removing any trailing subexpression is repeated in (d).

30. The method of claim 21, further comprising, after (g) and before (h):

(n) reading, by the computing device, adjacent recognizer expressions to a second recognizer expression in order from the sorted read recognizer expressions;

(o) comparing, by the computing device, adjacent recognizer expressions using each subexpression of the associated expression recognizer;

(p) removing, by the computing device, trailing subexpressions from the associated expression recognizer when the expression operator between subexpressions of the compared adjacent recognizer expressions is distinct; and (q) repeating, by the computing device, (n) to (p) for each remaining recognizer expression as the second recognizer expression exclusive of a last recognizer expression.

* * * * *

UNITED STATES PATENT AND TRADEMARK OFFICE
CERTIFICATE OF CORRECTION

PATENT NO. : 10,275,449 B1  
APPLICATION NO. : 16/150382  
DATED : April 30, 2019  
INVENTOR(S) : Keefe Hayes et al.

Page 1 of 1

It is certified that error appears in the above-identified patent and that said Letters Patent is hereby corrected as shown below:

In the Specification

Column 10, Lines 52-55:  
Delete the phrase "10.122.33.92 - - [24/Oct/207:13:18:03 -0500]    "GET /endpoint?parm1=abc&parm2=123 HTTP/1.1" 204    -    Apache-HttpClient/4.5.3 (Java/1.8.0_144) perform-service"," and replace with --10.122.33.92 - - [24/Oct/207:13:18:03 -0500] "GET /endpoint?parm1=abc&parm2=123 HTTP/1.1" 204 – "-" "Apache-HttpClient/4.5.3 (Java/1.8.0_144) perform-service",--.

Column 10, Lines 60-61:  
Delete the phrase "\d\d:\d\d:\d\d [+-]?\d{4})\] "(([A-Z-]*) ([^ ]*) ([^ ]*))" (\d{3}) (\d+|-)( "([^"]*)" "([^"]*)"|)$." and replace with --\d\d:\d\d:\d\d [+-]?\d{4})\] "(([A-Z-]*) ([^ ]*) ([^ ]*))" (\d{3}) (\d+|-)( "([^"]*)" "([^"]*)"|)$.--.

Column 10, Line 65:  
Delete the phrase ""[A-Z-]*" and replace with --"[A-Z-]*--.

Column 11, Line 44:  
Delete the phrase ""[A-Z-]*|\z))" and replace with --"[A-Z-]*|\z))--.

Signed and Sealed this  
Twenty-seventh Day of August, 2019

Andrei Iancu  
*Director of the United States Patent and Trademark Office*